(12) United States Patent
He et al.

(10) Patent No.: US 8,046,610 B2
(45) Date of Patent: Oct. 25, 2011

(54) POWER SUPPLY CONTROL IN A MOBILE PORTABLE DEVICE

(75) Inventors: Zhiqiang He, Beijing (CN); Ying Liang, Beijing (CN); Hai Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 488 days.

(21) Appl. No.: 12/159,583

(22) PCT Filed: Mar. 23, 2006

(86) PCT No.: PCT/CN2006/000479
§ 371 (c)(1),
(2), (4) Date: Sep. 29, 2008

(87) PCT Pub. No.: WO2007/076645
PCT Pub. Date: Jul. 12, 2007

(65) Prior Publication Data
US 2009/0307506 A1 Dec. 10, 2009

(30) Foreign Application Priority Data
Dec. 31, 2005 (CN) .......................... 2005 1 0132999

(51) Int. Cl.
*G06F 1/32* (2006.01)
*G06F 1/26* (2006.01)
(52) U.S. Cl. .................. 713/310; 713/300; 713/324
(58) Field of Classification Search .................. 713/300
See application file for complete search history.

(56) References Cited

U.S. PATENT DOCUMENTS

| 6,311,282 | B1 | 10/2001 | Nelson et al. | |
| 6,760,850 | B1 * | 7/2004 | Atkinson et al. | 713/320 |
| 2003/0095647 | A1 | 5/2003 | Cromer et al. | |
| 2003/0135726 | A1 | 7/2003 | Hagiwara et al. | |
| 2004/0003307 | A1 | 1/2004 | Tsuji | |
| 2004/0068666 | A1 * | 4/2004 | Tosey | 713/201 |
| 2005/0047356 | A1 * | 3/2005 | Fujii et al. | 370/311 |
| 2005/0085245 | A1 | 4/2005 | Danneels | 455/466 |
| 2005/0138454 | A1 * | 6/2005 | Darmawaskita et al. | 713/323 |
| 2005/0166077 | A1 | 7/2005 | Reisacher | |
| 2005/0188232 | A1 * | 8/2005 | Weng et al. | 713/320 |
| 2008/0113692 | A1 * | 5/2008 | Zhao et al. | 455/574 |
| 2009/0323573 | A1 * | 12/2009 | He et al. | 370/311 |

FOREIGN PATENT DOCUMENTS

| CN | 1157957 A | 8/1997 |
| CN | 2558008 Y | 6/2003 |
| CN | 1595331 | 3/2005 |

* cited by examiner

Primary Examiner — Ryan Stiglic
(74) Attorney, Agent, or Firm — Dickstein Shapiro LLP

(57) ABSTRACT

The present invention provides a mobile portable device comprising a network communication module, a power-on circuit, a switching power supply, a system power supply and external battery and a calculation unit, wherein the system power supply and external battery constantly supply power to the network communication module by using an external AC power supply or the power of the battery, when the mobile portable device is in a power-off/sleep state, and when the power-on circuit detects that the network communication module has received information from a network, it activates the switching power supply to supply power to the mobile portable device and thus put the mobile portable device into an operating state. By supplying power to the network communication module in the power-off/sleep state of the notebook computer, the computer can be in the network communication state at any time and thus will not miss any information transmitted over the network.

22 Claims, 2 Drawing Sheets

US 8,046,610 B2

POWER SUPPLY CONTROL IN A MOBILE PORTABLE DEVICE

BACKGROUND OF THE INVENTION

1. Field of Invention

The present invention relates to the field of communications and in particular to a mobile portable device.

2. Description of Prior Art

Nowadays, the emergence of GPRS, CDMA and 3G technologies further facilitates the connection between mobile portable devices such a notebook computer and the Internet. To enable mobile access to network, SMS transmission and reception, phone calling and the like with a notebook computer, what is required is only inserting a communication card (i.e., WWAN module, such as GPRS, CDMA or 3G wireless network card) into an interface (e.g., USB or Cardbus) of the notebook computer.

After access to the network and surfing the Internet by means of a WWAN module, a user usually leaves his or her SIM card in the WWAN module while the notebook computer enters a power-off state or a sleep state. In this case, if there is information (e.g., phone call or short message) sent from a wireless network, such as GPRS or CDMA network, the user can not receive such information.

For the conventional notebook computer, the WWAN module is not provided with power if the computer is in a power-off state or sleep state, and thus all operations associated with the WWAN module are un-activated. Even when the WWAN module has been supplied with power, such events as powering on or waking up the computer cannot be effected.

SUMMARY OF THE INVENTION

The object of the present invention is to provide a mobile portable device capable of performing online network communication at any time.

The mobile portable device of the present invention comprises a network communication module, a power-on circuit, a switching power supply, a system power supply and external battery and a calculation unit, wherein the system power supply and external battery constantly supply power to the network communication module by using an external AC power supply or the power of the battery, when the mobile portable device is in a power-off/sleep state, and when the power-on circuit detects that the network communication module has received information from a network, it activates the switching power supply to supply power to the mobile portable device and thus put the mobile portable device into an operating state.

The advantages of the present invention is that, by supplying power to the network communication module in the power-off/sleep state of the mobile portable device, the mobile portable device can be in the network communication state at any time and thus will not miss any information, including incoming call or short message, transmitted over the network.

DETAILED DESCRIPTION OF PREFERRED EMBODIMENTS

Now, a mobile portable device of the present invention will be illustrated by an example of a notebook computer in connection with the figures.

Figure 1:
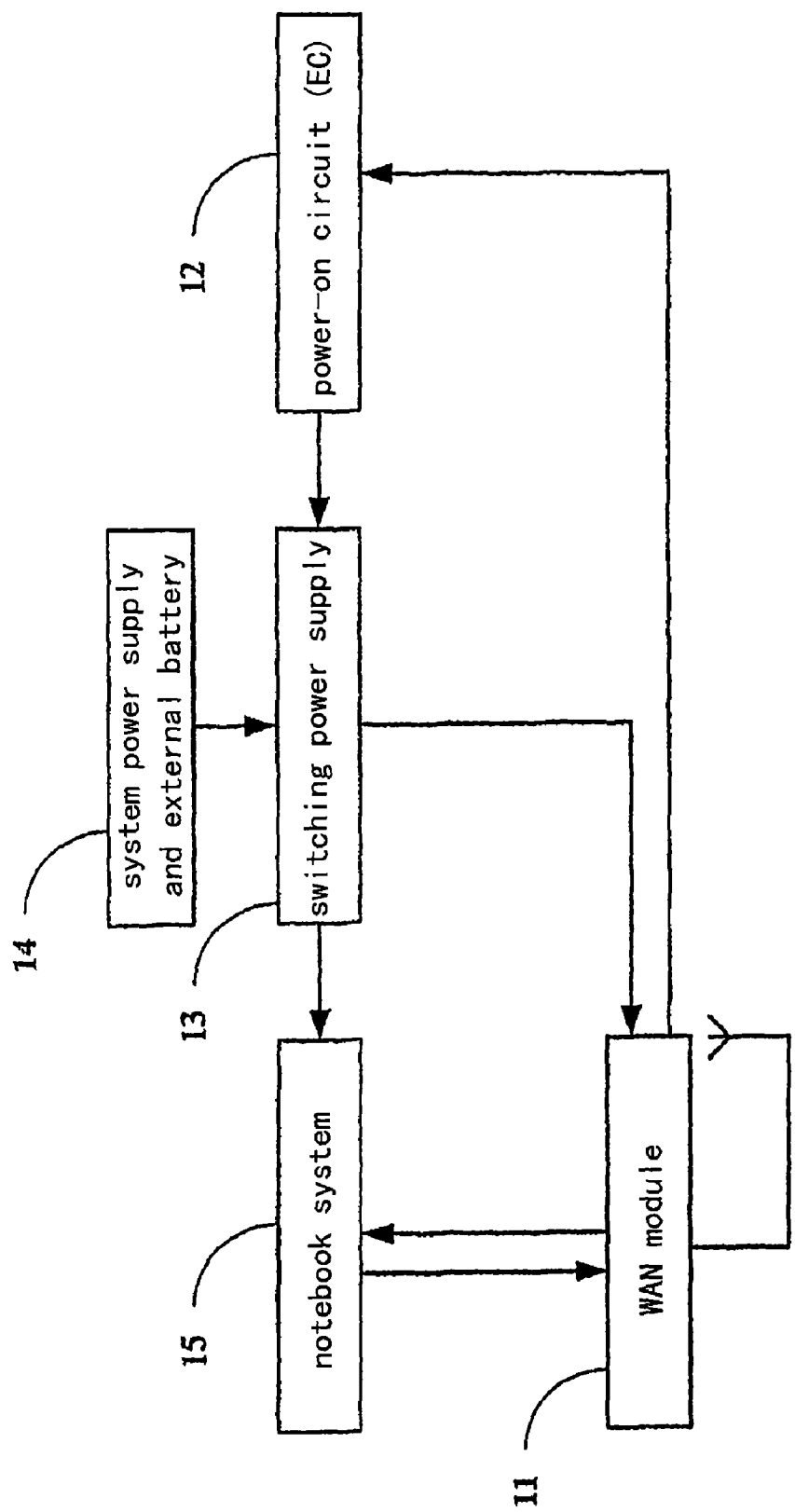
FIG. 1 is a schematic block diagram of a notebook computer with a built-in WWAN module according to the present invention.

FIG. 1 is a schematic block diagram of a notebook computer with a built-in WWAN module according to the present invention.

As shown in FIG. 1, the notebook computer of the present invention comprises a built-in WWAN module 11, an power-on circuit (EC) 12, a switching power supply (power supply control chip) 13, a system power supply and external battery 14 and a notebook system 15. The notebook system 15 includes hardware of a standard configuration of the notebook computer and associated software and receives information from a network through the WWAN module 11.

To enable the WWAN module 11 to receive information from the communication network in the power-off/sleep state of the notebook computer, it is necessary to supply power to the WWAN module 11 even after the computer device enters the power-off/sleep state and thus to keep the WWAN module 11 in a normal operating state.

As one of the simplest schemes for acquiring power supply, the notebook computer's own power supply can be used, that is, the external AC power or battery in the above system power supply and external battery 14. When the notebook computer has been turned off, the system power supply and external battery 14 supplies power to the WWAN module 11 via the switching power supply 13. This consumes only a very small amount of power.

When powered on, the notebook computer supplies power to the WWAN module 11 via the switching power supply 13 by using the power supply in the system power supply and external battery 14. The external battery can be charged when there is an external AC power supply. Specifically, the power-on circuit 12 sends an activation signal "Enable" to the switching power supply 13 upon the detection of a signal from the WWAN module 11. The switching power supply 13, on one hand, uses the system power supply and external battery 14 to supply power to the notebook system 15 for activation of a power-on/sleep recovery mode, and, on the other hand, use the system power supply and external battery 14 to power the WWAN module 11.

In FIG. 1, when the notebook computer is in the power-on state, the notebook system 15 is connected to the WWAN module 11 via a data interface, and transmits or acquires information over the network through the WWAN module.

Below, a detailed description will be given to the power-on/sleep recovery process of the notebook computer shown in FIG. 1.

For a built-in WWAN module in the present invention, the WWAN module 11 is powered on only after a SIM card has been inserted into the WWAN module 11. Thus, the card inserting slot for inserting a SIM card can be connected to the power-on circuit 12 via a GPIO port. When detecting that a SIM card has been inserted into the WWAN module 11 via the GPIO port, the power-on circuit 12 sends the activation signal "Enable" to activate the switching power supply 13. Having been activated, the switching power supply 13 applies the voltage of the system power supply and external battery 14 to the WWAN module 11 to power it on. On the other hand, the power-on circuit 12 sends a non-activation signal "Disable" to the switching power supply 13 upon no detection of an inserted SIM card. Since the switching power supply 13 is not activated, it cannot apply the voltage of the system power supply and external battery 14 to the WWAN module 11. In this way, effect of power saving can be achieved.

There are a variety of known WWAN modules and interfaces, among which the commonly-used interfaces include PCMCIA, USB, PCI interface, etc. When the notebook computer stays in the power-off/sleep state, the system power supply and external battery 14 needs to provide power to these interfaces so that the WWAN module can be kept in the operating state. At this moment, a user can hear a ring indicating that a call is established if he or she makes a phone call to the WWAN module 11.

Particularly, after the WWAN module 11 (with a SIM card inserted in), which is in the operating state while a call is coming in, receives the incoming call, a register of the processor in the WWAN module 11 is changed, and thus the level of the corresponding state pin is also changed. If the state pin is connected to the power-on circuit 12 via a GPIO port, the level change of the state pin can be detected by the power-on circuit 12. The power-on circuit 12 sends the activation signal "Enable" to the switching power supply 13 when it detects the level change of the state pin. The switching power supply 13, on one hand, uses the system power supply and external battery 14 to supply power to the notebook system 15 for activation of a power-on/sleep recovery mode, and, on the other hand, use the system power supply and external battery 14 to power the WWAN module 11. After the notebook computer has entered the power-on state, the GPIO port is suspended, and any message from the GPIO is not processed until the notebook computer enters the power-off/sleep state again.

Having been in the operating state, the notebook computer will quickly activate communication software of the operating system and conduct voice and data exchange tasks through the WWAN module 11 and the wireless network.

Figure 2:
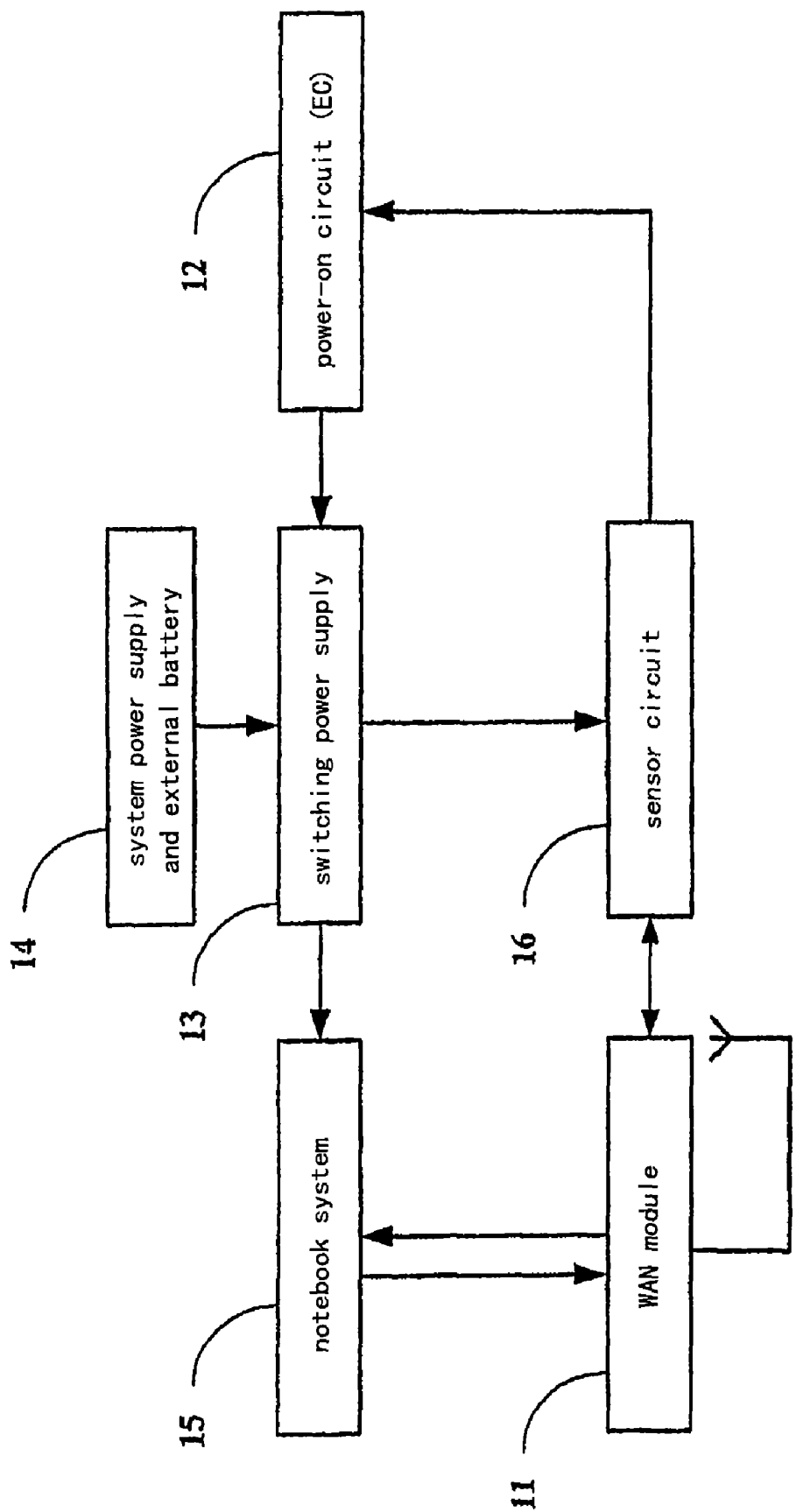
FIG. 2 is a schematic block diagram of a notebook computer with an externally-built WWAN module according to the present invention.

FIG. 2 is a schematic block diagram of a notebook computer with an externally-built WWAN module according to the present invention.

As shown in FIG. 2, the notebook computer of the present invention comprises an externally-built WWAN module 11, a power-on circuit 12, a switching power supply 13, a system power supply and external battery 14, a notebook system 15 and a sensor circuit 16. The notebook system 15 includes hardware of a standard configuration of the notebook computer and associated software and receives information from a network through the WWAN module 11.

To enable the WWAN module 11 to receive incoming information from the communication network in the power-off/sleep state of the notebook computer, it is necessary to supply power to the WWAN module 11 even after the computer enters the power-off/sleep state and thus to keep the WWAN module 11 in a normal operating state.

As one of the simplest schemes for acquiring power supply, the notebook computer's own power supply can be used, that is, the power in above system power supply and external battery 14. When the notebook computer has been shut down, the system power supply and external battery 14 supplies power to the sensor circuit 16 and the WWAN module 11 via the switching power supply 13. This consumes only a very small amount of power.

When powered on, the notebook computer supplies power to the WWAN module 11 via the switching power supply 13 and the sensor circuit 16 by using the power supply in the system power supply and external battery 14. Specifically, the power-on circuit 12 sends an activation signal "Enable" to the switching power supply 13 upon the detection of a signal from the WWAN module 11. The switching power supply 13, on one hand, uses the system power supply and external battery 14 to supply power to the notebook system 15 for activation of a power-on/sleep recovery mode, and, on the other hand, uses the system power supply and external battery 14 to power the WWAN module 11.

In FIG. 2, when the notebook computer is in the power-on state, the notebook system 15 is connected to the WWAN module 11 via a data interface, and transmits or acquires information over the network through the WWAN module.

Below, a detailed description will be given to the power-on/sleep recovery process of the notebook computer shown in FIG. 2.

For an externally-built WWAN module in the present invention, the WWAN module 11 is powered on only after a SIM card has been inserted into the WWAN module 11, as the case of a built-in WWAN module. Thus, the WWAN module 11 with a SIM card inserted is connected to the power-on circuit 12 via a GPIO port. When detecting via the GPIO port that a SIM card has been inserted into the WWAN module 11, the power-on circuit 12 sends the activation signal "Enable" to activate the switching power supply 13. Having been activated, the switching power supply 13 applies the voltage of the system power supply and external battery 14 to the WWAN module 11 to power it on. On the other hand, the power-on circuit 12 sends a non-activation signal "Disable" to the switching power supply 13 upon no detection of an inserted SIM card. Since the switching power supply 13 is not activated, it cannot apply the voltage of the system power supply and external battery 14 to the WWAN module 11. In this way, effect of power saving can be achieved.

For the externally-built WWAN module, the power of the WWAN module 11 varies a lot between an activation state and an idle state, when it is answering a phone call/receiving a short message. Therefore, the two states can be discriminated accordingly.

As shown in experimental results, the WWAN module 11 consumes about 80 mA in the idle mode, while the operating current ranges from 350 to 450 mA when a phone call is received. Therefore, the sensor circuit 16 is used to detect the operating current of the WWAN module 11 in the present invention. As an example, the sensor circuit 16 (Power Switch chip) can detect a current of 250 mA. When the current flowing through the sensor circuit 16 exceeds 250 mA, its pin OC# sends out a low level warning that the current is now below 250 mA. The pin OC# can be connected to the power-on circuit 12 via a GPIO port, and its state change can be detected by the power-on circuit 12. Upon detection of the low level, the power-on circuit 12 starts the power-on/sleep recovery mode for the notebook computer. Meanwhile, the GPIO port is suspended and its register bit is masked to prevent false power-on, until the notebook computer is in the power-off/sleep state again. There are many types of known WWAN modules, among which the widely-used module includes a Cardbus card (32 bit), for example. There is a state change signal among the bus signals of the Cardbus card. The event of an incoming call from outside can cause a change in the signal of the Cardbus card when the Carbus is powered normally. In the present invention, such change can be detected by the power-on circuit 12 so as to wake up the notebook computer from the power-off/sleep state.

After being waken up, the notebook computer will quickly perform communication software of the operating system and conduct voice and data exchange tasks with the outside.

In both of the above cases, the notebook computer can be designed as a two-screen notebook computer, in which a small liquid crystal screen is provided on the upper cover. When a phone call/short message has come in, the power-on circuit activates the system of the small liquid crystal screen and emits a ring for user notification. In this way, the user can use this system to communicate with the outside world.

Further, by customizing a BIOS dedicated to wake up the notebook computer, only the hardware associated with network communication content needs to be initialized after the wakeup of the notebook computer. In this way, the notebook computer can quickly enter the operating system and launch a communication interface to exchange voice and data with the outside.

As can been seen from the foregoing description, the notebook computer of the present invention is capable of receiving network information in real time. Thus, with the WWAN module being always online, the instant messaging software, including QQ, phone call answering, SMS transmission and reception, etc, can be started at any moment to conduct network communication. The notebook computer can be awakened remotely. Only the hardware associated with the current service needs to be started at the time of power-on. And the notebook computer is powered off automatically after the task is fulfilled. Further, with the WWAN module being always online, the host computer can be awakened at any moment to send/receive mails. When the computer receives an incoming call and nobody answers it, it is possible to enter an audio recording system, to forward the call or to forward the received short message and phone number. In addition, a local PC can be called, and a telephone conference can be held through SKYPE, QQ or MSN, which saves cost for long-distance phone. Also, a short-message customization task can be used after the system is woken up.

The application of the present invention to a wireless network has been explained in the above description with reference to FIGS. 1 and 2. It can be appreciated that the present invention can also be applicable to a wired network. In this case, the only difference is to replace the WWAN module with a wired network adapter, which is supplied with power in the same manner as that for the WWAN module. The rest of the overall processing is identical, and description thereof is omitted. Moreover, it can be understood that this invention is adapted to a mobile portable device, although this invention is illustrated by an example of a notebook computer.

The present invention is not limited to the above embodiments. Any modification, change or substitution readily made by those ordinarily skilled in the art after reading the application shall fall into the scope defined by the claims of the present invention.

The invention claimed is:

1. A mobile portable device comprising a network communication module, a power-on circuit, a switching power supply, a system power supply and external battery and a calculation unit, wherein the system power supply and external battery constantly supply power to the network communication module by using an external AC power supply or the power of the battery, when the mobile portable device is in a power-off/sleep state, and when the power-on circuit detects that the network communication module has received information from a network, it activates the switching power supply to supply power to the mobile portable device and thus put the mobile portable device into an operating state,
wherein said network communication module comprises a wireless network module or a wired network adapter,
and wherein the wireless network module is connected to the power-on circuit via a first IO port, when detecting the insertion of a subscriber identity identification card, the power-on circuit activates the switching power supply and supplies power to the wireless network module by using the external AC power supply of the system power supply and external battery or power of the battery.

2. The mobile portable device according to claim 1, wherein the system power supply and external battery supply power to the network communication module by using a power supply contained in the system power supply and external battery, when the mobile portable device is in the operating state.

3. The mobile portable device according to claim 2, wherein said network communication module comprises a wireless network module or a wired network adapter.

4. The mobile portable device according to claim 1, wherein, when detecting that the wireless network module has received information from a network, the power-on circuit activates the switching power supply, which starts up the calculation unit, and a second IO port is suspended after the mobile portable device enters a power-on state.

5. The mobile portable device according to claim 4, wherein the wireless network module comprises a state pin which is connected to the power-on circuit via the second IO port, a voltage level of the state pin changes when the wireless network module has received information from the network, the power-on circuit activates the switching power supply to start up the mobile portable device when it detects a change of the voltage level of the state pin, and the second IO port is suspended after the mobile portable device enters a power-on state.

6. The mobile portable device according to claim 4, wherein the mobile portable device comprises a dedicated BIOS such that only the hardware associated with network communication content is initialized after the wakeup of the mobile portable device.

7. The mobile portable device according to claim 4, wherein the wireless network module comprises a register which is masked when the IO port is suspended.

8. The mobile portable device according to claim 1, further comprising a sensor circuit,
wherein
when detecting that the wireless network module has received information from a network, the sensor circuit outputs the detection result to the power-on circuit via a third IO port,
the power-on circuit activates the switching power supply based on the detection result, and the switching power supply starts up the calculation unit, and
the third IO port is suspended after the mobile portable device enters a power-on state.

9. The mobile portable device according to claim 8, wherein the sensor circuit determines whether the wireless network module has received information from a network by detecting the operating current of the wireless network module.

10. The mobile portable device according to claim 8, wherein the mobile portable device comprises a dedicated BIOS such that only the hardware associated with network communication content is initialized after the wakeup of the mobile portable device.

11. The mobile portable device according to claim 8, wherein the wireless network module comprises a register which is masked when the IO port is suspended.

12. A method for waking up a mobile portable device, said method comprises
supplying power to the network communication module of the mobile portable device constantly, when the mobile portable device is in a power-off/sleep state, and activating the switching power supply to supply power to the mobile portable device and thus put the mobile portable device into an operating state, when detecting that the network communication module has received information from a network, wherein said network communication module comprises a wireless network module or a wired network adapter, and wherein when detecting the insertion of a subscriber identity identification card, activates the switching power supply and supplies power to the wireless network module by using an external AC power supply of the system power supply and the external battery or power of the battery, the wireless network module is connected to the power-on circuit via a first IO port.

13. The method according to claim 12, wherein the system power supply and external battery supply power to the network communication module, when the mobile portable device is in the operating state.

14. The method according to claim 13, wherein said network communication module comprises a wireless network module or a wired network adapter.

15. The method according to claim 12, wherein when detecting that the wireless network module has received information from a network, activates the switching power supply, and the switching power supply starts up the calculation unit, and a second IO port is suspended after the mobile portable device enters a power-on state.

16. The method according to claim 12, further comprising outputting the detection result to the power-on circuit via a third IO port, when detecting that the wireless network module has received information from a network, activating by the power-on circuit the switching power supply based on the detection result, and the switching power supply starts up the calculation unit, and suspending the third IO port after the mobile portable device enters a power-on state.

17. The method according to claim 16, wherein a sensor circuit is adapted to determine whether the wireless network module has received information from a network by detecting the operating current of the wireless network module.

18. A mobile portable device comprising a network communication module, a power-on circuit, a switching power supply, a system power supply and external battery and a calculation unit, wherein the system power supply and external battery constantly supplies power to the network communication module by using an external AC power supply or a power of the battery, when the mobile portable device is in a power-off/sleep state, and when the power-on circuit detects that the network communication module has received information from a network, it activates the switching power supply to supply power to the mobile portable device and thus put the mobile portable device into an operating state;

wherein the network communication module comprises a wireless network module which is connected to the power-on circuit, when detecting the insertion of a subscriber identification card, the power-on circuit activates the switching power supply and supplies power to the wireless network module by using an external AC power supply of the system power supply and the external battery or the power of the battery.

19. The mobile portable device according to claim 18, wherein the wireless network module is connected to the power-on circuit via a first IO port.

20. The mobile portable device according to claim 19, wherein, when detecting that the wireless network module has received information from a network, the power-on circuit activates the switching power supply, and the switching power supply starts up the calculation unit, and a second IO port is suspended after the mobile portable device enters a power-on state.

21. The mobile portable device according to claim 19, further comprising a sensor circuit, wherein when detecting that the wireless network module has received information from a network, the sensor circuit outputs the detection result to the power-on circuit via a third IO port, the power-on circuit activates the switching power supply based on the detection result, and the switching power supply starts up the calculation unit, and the third IO port is suspended after the mobile portable device enters a power on state.

22. The mobile portable device according to claim 21, wherein the sensor circuit determines whether the wireless network module has received information from a network by detecting the operating current of the wireless network module.

* * * * *